Patented June 15, 1954

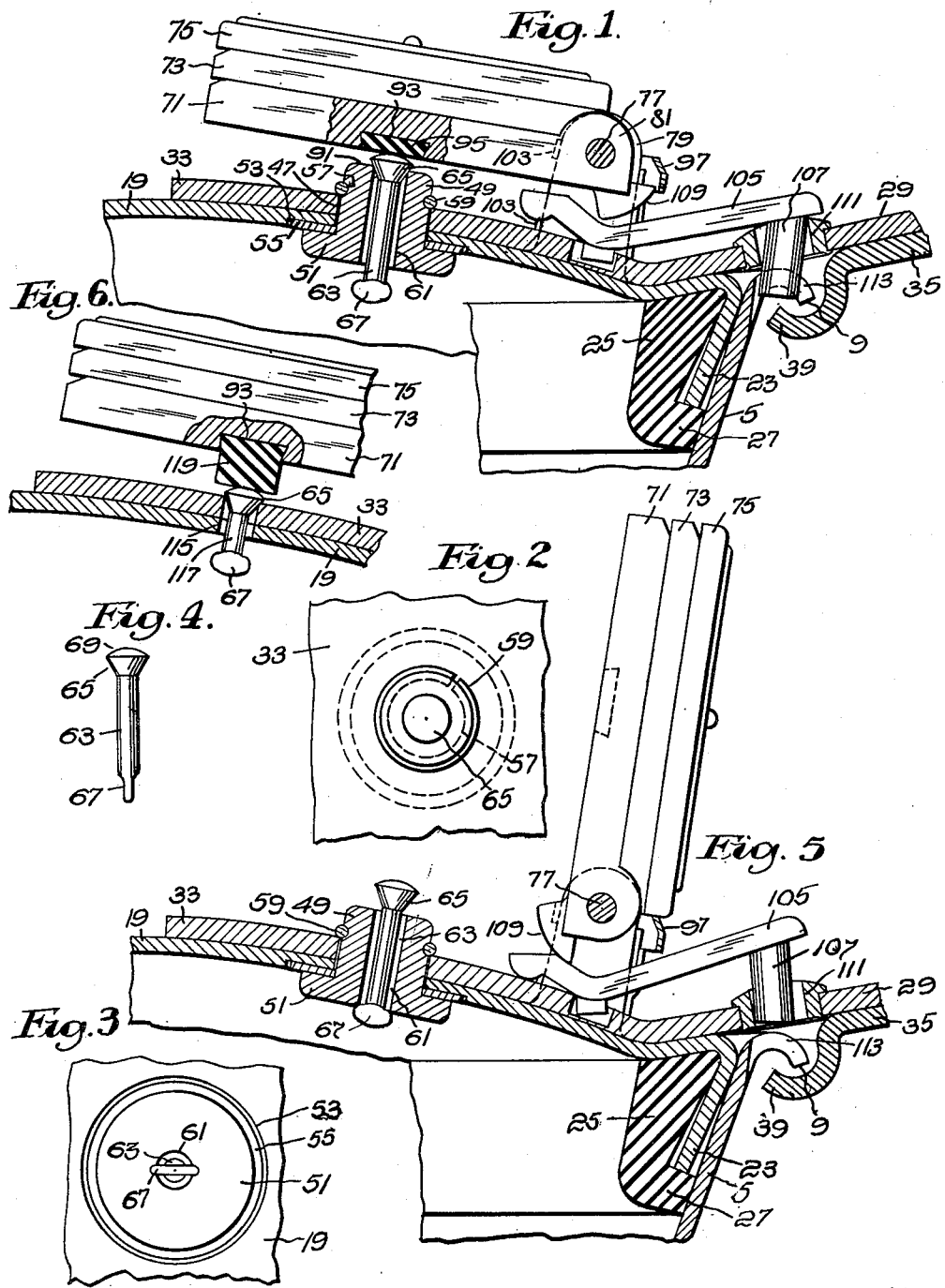

2,681,075

UNITED STATES PATENT OFFICE 2,681,075

PIVOTED WEIGHT CONTROLLED VENT VALVE FOR PRESSURE COOKERS

William A. Welden, Stamford, Conn., assignor to Revere Copper and Brass Incorporated, Rome, N. Y., a corporation of Maryland Application January 13, 1949, Serial No. 70,626

2 Claims. (Cl. 137—534)

My invention relates to vent controlling means for pressure cookers.

The invention has among its objects improved means for controlling the pressure conditions within a pressure cooker, being in these respects an improvement on the pressure cookers shown by my co-pending applications Serial Number 677,043, filed June 15, 1946, now Patent No. 2,614,723 issued October 21, 1952, and Serial Number 695,128, filed September 6, 1946, now Patent No. 2,614,725, issued October 21, 1952, and those shown by co-pending applications of Glenn C. Wyman Serial Number 18,280, filed March 31, 1948, now Patent No. 2,614,721; issued October 21, 1952, and Serial Number 26,862, filed May 13, 1948, now Patent No. 2,614,724, issued October 21, 1952.

The invention will be best understood from the following description when read in the light of the accompanying drawings of several specific embodiments of the invention selected for illustrative purposes, while the scope of the invention will be more particularly pointed out in the appended claims.

In the drawings:

Fig. 1 is a transverse radial section of a fragment of the cover and adjacent part of the container of a pressure cooker according to the invent, with parts in elevation;

Fig. 2 is a plan view of part of the fragment of the pressure cooker cover according to Fig. 1;

Fig. 3 is a bottom view of the fragment of the pressure cooker cover according to Fig. 2;

Fig. 4 is an elevation of the pressure cooker relief valve;

Fig. 5 shows the parts according to Fig. 1 in a different operative position; and Fig. 6 is a fragmentary view showing a modification of the pressure cooker relief valve mechanism according to Fig. 1.

The pressure cooker illustrated by the drawings is generally like that shown by the above mentioned Glenn C. Wyman Patent No. 2,614,724, the pressure cooker according to said patent comprising a container preferably formed of sheet metal such as stainless steel, which container has a bottom wall and cylindrical side walls, the side walls being formed to present an outwardly flared frusto-conical portion, herein indicated at 5 (Fig. 1), extending entirely about said walls. As also shown by said patent, this frusto-conical portion is formed at its upper edge to present an inwardly turned lip, not shown herein, extending about said portion for approximately 180°, and at the side of this portion diametrically opposite said lip said portion is formed with an outwardly projecting downwardly turned lip, herein indicated at 9, of shorter angular extent than the other lip.

As further shown by said Patent No. 2,614,724, the cover, which likewise is preferably formed of sheet metal, is shaped to present a dome-like central portion, herein indicated at 19, and an inwardly turned downwardly extending frusto-conical flange, herein indicated at 23, which flange extends entirely about the cover. Carried by the cover at its under side is a gasket ring 25 of greater height than the flange 23, this ring being formed of flexible material, such as synthetic rubber, and being shaped to fit into the space between the flange 23 and adjacent portion of the cover and to provide a lower portion 27 which projects radially beyond the outer side of the flange at its lower edge so as to bear uninterruptedly against the inner wall of the frusto-conical portion 5 of the container when the cover is assembled with the latter.

As still further shown by said Patent No. 2,614,724, the cover is provided with a radially projecting handle, herein indicated at 29, which handle is provided with a base portion 33, such base portion and the adjacent portion of the handle conforming to the upper sides of the dome-shaped portion 19 and adjacent portion of the cover to which they are secured preferably by welding. Secured to the under side of the handle 29, preferably by welding, is the base 35 of a strip-like member which, at its end adjacent the cover, is formed to provide a hook 39. As more fully described in said Patent No. 2,614,724, when the cover is placed on the container the cover may be rotated to bring the above described lip 9 on the container into cooperation with the hook 39 on the cover and the lip at the opposite side of the container into cooperation with the adjacent side of the cover to retain the cover on the container.

When the cover is initially secured to the container the projecting portion 27 of the gasket ring 25 bears against the frusto-conical container portion 5 so as to seal the joint between the cover and container and thus permit pressure to build up in the cooker. When the pressure builds up the cover rises to take up the clearances in the means securing it to the container, the gasket because of its resiliency and the pressure in the cooker remaining in contact with the frusto-conical container portion 5 so that at all times the gasket renders the joint between the cover and the container steam-tight in respect to a positive pressure within the cooker.

Referring to Figs. 1, 2, and 3, the base portion 33 of the cover handle 29 and the cover portion 19 immediately below it are formed with a perforation 47 in which is received the shank 49 of a plug having a head 51 at the under side of the cover. As shown, the portion of the under side of the cover surrounding the perforation 47 is formed with a shallow annular recess 53 for receiving a resilient annular gasket washer 55 interposed between the bottom of said recess and the upper side of the head 51. As illustrated, the shank 49 is shown as formed on its outer cylindrical surface with an annular groove 57 which removably receives a resiliently expansible split metal ring 59 bearing against the upper side of the cover handle base 33 for removably retaining the plug within the perforation 47. Pressure within the cover tends to force the head 51 against the gasket washer 55, which renders the joint between the plug and cover fluid-tight.

As shown, the plug 49, 51 is formed with a through passage 61 serving as a vent for the cooker. Extending through this passage is the downwardly extending shank or stem 63 of a reciprocatory frusto-conical valve 65 formed integrally with the shank at its upper end, the lower end of the shank being flattened to provide a head 67 for retaining the valve in assembled relation with the plug.

As shown, the valve 65 is provided with a rounded upper surface 69 against which is adapted to rest the lowermost weight 71 of three weights 71, 73 and 75, the arrangement of these weights being that shown by the above mentioned Patent No. 2,614,724, and therefore in this application need not be described with any more particularity than necessary to set forth the present invention. These weights are supported for swinging movement on a pin 77 which at opposite ends is carried by the upwardly projecting ears 79 formed integrally with the cover handle 29. For so supporting the weights the lower weight is provided with upwardly projecting spaced lugs 81, while the intermediate weight 73 and upper weight 75 are formed with similar but downwardly projecting spaced lugs (not shown herein) which are received in the space between the lugs 81, the pin 77 extending through all these lugs.

In the position of parts shown by Fig. 1 the weights 73 and 75 are supported by the weight 71, and all of them act to hold the valve 65 against its seat formed by the intersection of the through passage 61 with the upper end surface 91 of the shank 49 of the plug 49, 51, which permits pressure to build up in the cooker until the outwardly exerted force of such pressure on the valve lifts it away from its valve seat against the downwardly exerted force of the three weights on the valve. When desired the three weights may be manually moved to the position shown by Fig. 5 for completely relieving the pressure within the cooker. From this position the lowermost weight only, or that weight and the intermediate weight only, or all three weights, may be moved to their positions shown by Fig. 1 for selectively determining the maximum pressure to be maintained in the cooker.

As shown, the lower most weight 71 is formed with a recess 93 which receives an insert 95, which preferably is formed of shock absorbent material such as rubber, for relieving the valve from shocks tended to be imparted by the weights when they are caused to fall from their positions shown by Fig. 5 to their positions shown by Fig. 1.

Heretofore it has been proposed to have the valve carried by the lowermost of the swinging weights, which makes it extremely difficult to seat the valve properly on the valve seat, necessitating the provision of a valve which may slide laterally relative to the weights or the provision of a valve seat which may slide laterally relative to the cover, as shown in the above mentioned patents. By the present construction the necessity for this is entirely avoided.

As illustrated, for forming a support for the weights when they are in their position shown by Fig. 5, in which position their centers of gravity are at the right of the pin 77 as illustrated in that figure, there is provided a clip having a portion 97 (Fig. 5) against which the weight 75 rests when it is in its position shown by Fig. 5. This clip, which may be identical with that described by the hereinbefore mentioned Patent No. 2,614,724, and specifically forms no part of the present invention, is carried by the spaced ears 79 which support the pin 77 on which the weights are pivoted.

If desired, there may be employed the locking device for the cover comprising a swinging lever 105 carrying the downwardly projecting pin 107, which latter is operated into released position by the cam 109 on the lowermost weight 71, when said weight is swung from its position shown by Fig. 1 to that shown by Fig. 5. The pin 107 is movably received in a perforation 111 operatively formed in the cover handle 29. When the pin is in its position shown by Fig. 1 it extends into a notch 113, formed intermediate the length of the lip 9 on the container, for preventing the cover from being rotated relative to the container. When the weights are swung to their position shown by Fig. 5 the pin is lifted from the notch 113 to permit the cover to be rotated for releasing it from the container.

In operating the cooker, after the container is charged with food to be cooked the cover may be placed on the container and rotated to secure it thereto with all the weights in their raised positions shown by Fig. 5. Such rotation of the cover will place the pin 107 in vertical alignment with the notch 113 in the lip 9 of the container, so that when the lower weight is moved by the operator from its position shown by Fig. 5 to that shown by Fig. 1 the lever 105 will be permitted to swing downward by gravity to cause the pin 107 to enter the notch for preventing release of the cover until the weights are again swung to their positions shown by Fig. 5.

If desired, the relief valve may be carried directly by the cover as shown by Fig. 6. According to this figure, the cover handle base 33 and portion 19 of the cover immediately below it are formed with aligned perforations 115 through which the shank or stem 117 of the relief valve extends, this valve being identical with the relief valve heretofore described except that the stem 117 of the former is shorter than the stem 63 of the latter. In the modification shown by Fig. 6 the shock absorbent insert 119 projects beyond the bottom of the lower weight 71 to compensate for the absence of a plug 49, 51 employed in the modification heretofore described.

It will be understood that in both the modification shown by Fig. 1 and that shown by Fig. 6 the pressure cooker cover constitutes the "supporting part" included as an element of the appended claims.

It will also be understood that within the scope of the appended claims wide deviations may be made from the form of the invention described without departing from the spirit of the invention.

I claim:

1. Pressure controlling means for a pressure cooker, which means comprises a supporting part operatively formed with a vent opening presenting an upwardly facing valve seat; an upwardly and downwardly movable vent valve in said opening having a portion providing a downwardly facing surface for contacting said valve seat for closing said opening when said valve is moved downward, which valve seat acts as a stop to prevent downward movement of said valve beyond that which will place said surface in such contact; said valve having portions adapted for exposure to the pressure within the vent opening for lifting said valve for moving said surface out of contact with said valve seat for venting the opening; the valve comprising a stem loosely received within said opening, and a portion carried by said stem operatively cooperating with said supporting part for retaining the valve from removal from said opening when said valve is so lifted; a controlling weight for said valve separate from said valve; means attaching said weight to said supporting part for swinging about a horizontal axis at one side of said valve, said weight having a position of swinging in which its center of gravity is at the same side of said axis as said valve, the weight and valve having cooperating portions for causing said weight, when it is in such position of swinging, operatively and continuously to rest on and be supported by said valve for urging the latter downwardly against the upwardly acting force adapted to be exerted on the valve by the pressure within the vent opening; said weight having a second position of swinging in which its center of gravity is at the side of said axis remote from said valve for retaining said portions of said weight and valve out of cooperation for causing said valve to be uncontrolled by said weight.

2. Pressure controlling means, for a pressure cooker, according to claim 1 in which the stem of the valve adjacent its upper end carries the portion of the valve having the downwardly facing surface that is adapted to contact with the valve seat, and, adjacent its lower end, carries the portion of the valve that retains the valve from removal from the vent opening, the valve presenting an upper surface portion which constitutes the portion of the valve on which the cooperating portion of the weight is adapted to rest for urging the valve downward, the weight at its under side having a flat surface which is in closely adjacent spaced relation to the supporting part and surrounds the axial line of the valve when the weight so urges the valve, the under side of the weight at its central portion having the portion of the weight that is adapted to rest on said upper surface portion of the valve.

References Cited in the file of this patent

UNITED STATES PATENTS

| Number | Name | Date |
|---|---|---|
| 639,435 | Ringi | Dec. 19, 1899 |
| 993,013 | Bartlett | May 23, 1911 |
| 1,474,192 | Gessler et al. | Nov. 13, 1923 |
| 1,494,487 | Jacobs | May 20, 1924 |
| 1,499,364 | Goodrick | July 1, 1924 |
| 1,508,696 | Jacobs | Sept. 16, 1924 |
| 1,585,512 | Roades | May 18, 1926 |
| 1,698,929 | Wentorf | Jan. 15, 1929 |
| 2,308,603 | Graham | Jan. 19, 1943 |
| 2,427,764 | Carson | Sept. 23 1947 |
| 2,436,566 | Goldberg | Feb. 24, 1948 |
| 2,483,297 | Naylor | Sept. 27, 1949 |
| 2,509,101 | Kircher | May 23, 1950 |